United States Patent [19]

Burba, III et al.

[11] Patent Number: 4,664,843

[45] Date of Patent: May 12, 1987

[54] MIXED METAL LAYERED HYDROXIDE-CLAY ADDUCTS AS THICKENERS FOR WATER AND OTHER HYDROPHYLIC FLUIDS

[75] Inventors: John L. Burba, III, Angelton; Audrey L. Barnes, Lake Jackson, both of Tex.

[73] Assignee: The Dow Chemical Company, Midland, Mich.

[21] Appl. No.: 752,326

[22] Filed: Jul. 5, 1985

[51] Int. Cl.$^4$ .................... B01J 13/00; C01B 33/28; C09K 7/00
[52] U.S. Cl. ..................... 252/315.5; 252/2; 252/8.51; 252/8.512; 252/28; 252/71; 252/174.25; 252/184; 423/328
[58] Field of Search ................ 252/8.5 B, 184, 315.5, 252/8.51, 8.512, 28, 35; 423/328 C; 501/147

[56] References Cited

U.S. PATENT DOCUMENTS

| | | | |
|---|---|---|---|
| 3,252,757 | 5/1966 | Granquist | 252/8.5 B X |
| 3,391,088 | 7/1968 | Plank et al. | 423/328 E X |
| 3,855,147 | 12/1974 | Granquist | 252/315.5 |
| 4,318,732 | 3/1982 | Sawyer, Jr. | 252/315.5 X |
| 4,392,979 | 7/1983 | Lee et al. | 252/184 |
| 4,446,201 | 5/1984 | Lee et al. | 428/696 |
| 4,477,367 | 10/1984 | Burba, III | 252/184 |

*Primary Examiner*—Richard D. Lovering
*Attorney, Agent, or Firm*—Walter J. Lee

[57] ABSTRACT

Novel compositions useful as fluid gelling agents, especially for use in subterranean applications such as drilling fluids, are prepared by reacting an aqueous dispersion of a clay, such as bentonite, with an aqueous gel of a monodispersed mixed metal layered hydroxide of the formula $Li_m D_d T(OH)_{m+2d+3+na} A_a^n$, where D is a divalent metal, such as Mg, T is a trivalent metal, such as Al, and A represents other monovalent or polyvalent anions, the formula being described in detail in the disclosure.

22 Claims, No Drawings

MIXED METAL LAYERED HYDROXIDE-CLAY ADDUCTS AS THICKENERS FOR WATER AND OTHER HYDROPHYLIC FLUIDS

FIELD OF THE INVENTION

Thickening of water or hydrophylic solvents by the use of clay-mixed metal layered hydroxide compounds.

BACKGROUND OF THE INVENTION

There are various reasons for thickening water aqueous, solutions, hydrophylic solvents, and the like, such as for use as water based metal working fluids, fire control fluids, oil field drilling fluids, food additives, hydraulic fluids, water-based paints or coatings, stripping solutions, and other applications wherein thickening of a liquid or solution is beneficial.

Water thickening agents, such as guar gum and polyacrylamide are not stable to high shear, hydrothermal treatment above about 250° F. (121° C.), oxidation, bacterial attack, and salts. To make up for some of these problems, such additives as bactericides and antioxidants are sometimes required.

Thickening agents or viscosifying agents for aqueous materials, such as drilling fluids, which involve some form of hydrous aluminum compound are disclosed, for example in U.S. Pat. Nos. 4,240,915, 4,349,443, 4,366,070, 389,319, 4,428,845, 4,431,550, 4,447,341, 4,473,479, and 4,486,318. Patents disclosing other forms of aluminum compounds for the same purpose are, e.g., U.S. Pat. Nos. 4,240,924, 4,353,804, 4,411,800, and 4,473,480. Similar patents disclosing other types of viscosifying agents are, e.g., U.S. Pat. Nos. 4,255,268, 4,264,455, 4,312,765, 4,363,736, and 4,474,667.

These patents deal with the formation of the hydrous aluminum compounds in-situ. The major disadvantages to such a process are: (1) The resulting thickened fluid contains copious amounts of reaction salts. This may be undesirable in many situations. For example, in applications such as paints, metal working fluids, or water-based hydraulic fluids, the presence of salt could cause severe corrosion problems. In the case of oil field drilling fluids, many performance additives do not work well if salt is present. Thus it is desirable to drill in fresh water if possible. (2) The reactions described in the cited patents are run in-situ (e.g. in the mud pit of a drilling rig). Under such conditions, the reaction cannot be adequately controlled and the properties of the resultant thickener may be unpredictable.

Other problems with the use of $Al(OH)_3$ as a gelling agent for processes such as oilfield drilling fluids are as follows:

1. $Al(OH)_3$ gels are known to detrimentally change with time unless certain salts such as carbonate salts are present.

2. The rheology of $Al(OH)_3$ is not very constant with changing pH values. For example, a slurry of $Al(OH)_3$ may be very thick and uniform at pH 6 but at pH 10, which the drilling industry prefers, the slurry collapses and the $Al(OH)_3$ settles out of suspension. This creates significant problems since most drilling operations are run at pH values in the range of 9 to 10.5.

An historically popular thickening agent, especially in drilling mud, has been mineral clays, such as bentonite clay, often used with other agents or densifiers, such as $Fe_2O_3$, $BaSO_4$, and others. Variations from batch to batch of bentonite clay and especially sensitivities to ions and temperature have resulted in erratic results and adjustment of the formulation is often required during use; this hampers the drilling operations.

Certain forms of crystalline layered mixed metal hydroxides are disclosed, e.g., in U.S. Pat. Nos. 4,477,367, 4,446,201, and 4,392,979, wherein Li, Mg, Cu, Zn, Mn, Fe, Co, and Ni are part of the layered crystal structure. Other metal aluminates are disclosed, e.g., in U.S Pat. Nos. 2,395,931, 2,413,184, 3,300,577, and 3,567,472. These compounds are prepared through various reactions including coprecipitations, intercalations, acid digestions and base digestions.

In the drilling of oil wells, drilling fluids or "muds" perform several functions:
1. They remove cuttings from the hole.
2. They cool the drill bit.
3. They provide hydrostatic pressure to balance formation pressure.
4. They control ingress of fluids into the formation and protect the formation.

Functions 1. and 3. in the above list can only be performed if acceptable rheology is present in the drilling fluid. The most desirable rheology that a drilling fluid can exhibit is pseudoplasticity. There are several shear zones in the bore hole of a well and the fluid should have varying viscosities in these zones. In the annulus, between the drill pipe and the formation, the shear rate is approximately 100 to 1000 $sec^{-1}$. At the drill bit the shear rate is between about 25,000 and 200,000 $sec^{-1}$. In the mud pit the shear rate is less than 30 $sec^{-1}$. In order to carry drill solids at low shear rates, a fluid must have a significant viscosity. However, if the fluid has a high viscosity at the drill bit, energy is lost in pumping the fluid. Thus, a good drilling fluid should be shear thinning. It is very important that the fluid maintain this rheology throughout the drilling process. However, many adverse conditions that typically inhibit the performance of existing drilling fluids are, various cations such as calcium and magnesium, fluctuating salt concentrations, high temperatures, oxidation conditions, and the presence of bacteria.

Some of the commercially accepted gelling agents that are used in water-based drilling fluids are polymers such as xanthan gum, guar gum and polyacrylamides. Non-polymer gelling agents are typically clays such as bentonite and attapulgite. Each of these gelling agents has its own limitations. The polymers typically have instability to various salts, they are susceptible to oxidation and bacterial attack, they break down under extensive shear, and they are thermally stable to only about 250° to 300° F. The most popular clay gelling agent is bentonite. This material is severely affected by polyvalent cations and is limited to about 93° C. unless certain thinners are incorporated. However, bentonite cannot be oxidized, and it is completely stable to high shear conditions.

Often, polymeric materials are added to the bentonite dispersions in order to be able to use less clay. Some of the common bentonite extenders are polyacrylamide, and Benex, ® copolymer which is available from Baroid. In a typical extended bentonite system, the bentonite level is between 15 and 20 lb/bbl and the extending polymer level is usually between 0.1 and 0.5 lb/bbl. The extended bentonite system is still susceptible to problems associated with divalent ions such as $Ca^{+2}$, and it is only as thermally stable as the extending polymer. The systems are also susceptible to bacterial attack and oxidation.

SUMMARY OF THE INVENTION

In accordance with the present invention a novel composition of matter is prepared, consisting of the reaction product of clay mineral, such as sodium bentonite, and a mixed metal layered hydroxide. This new composition has utility as a gelling agent of, for example, a drilling fluid, or other thixotropic fluid. The mixed metal layered hydroxide compound has the following empirical formula $$Li_m D_d T(OH)_{m+2d+3+na} A_a^n,$$

where
m represents the number of Li ions present;
D represents divalent metals ions; and
d is the number of ions of D in the formula;
T represents trivalent metal ions;
A represents monovalent or polyvalent anions other than OH ions;
a is the number of ions of A in the formula;
n is the valence of A; and
where (m+2d+3+na) is equal to or greater than 3.

These layered mixed metal hydroxides are preferably prepared by an instantaneous ("flash") coprecipitation wherein soluble compounds, e.g., salts, of the metals are intimately mixed (using non-shearing agitation or mixing) with an alkaline material which supplies hydroxyl groups to form the mixed metal hydrous oxide crystals. While the empirical formula is similar to previously disclosed compositions, a distinguishing feature of the present composition is that the crystals are essentially monolayer, or one layer of the mixed metal hydroxide per unit cell, which we call "monodispersed" crystals when they are in a liquid carrier, meaning that they are individual crystals of monolayer mixed metal hydroxides. These monodispersed monolayer crystals are believed to be novel.

DETAILED DESCRIPTION

In the above formula, m may be from zero to about 1, most preferably 0.5 to about 0.75, when used.

The D metal may be Mg, Ca, Ba, Sr, Mn, Fe, Co, Ni, Cu, Zn, most preferably, Mg, Ca, or mixtures of these, and the value of d may be from zero to about 4, preferably about 1 to about 3 and most preferably about 1.

The T metal may be Al, Ga, Cr, or Fe, preferably Al, and Fe, and most preferably Al.

The A anions may be monovalent, divalent, trivalent or polyvalent, and they may be inorganic ions such as halide, sulfate, nitrate, phosphate, carbonate, most preferably halide, sulfate, phosphate, or carbonate, or they may be hydrophylic organic ions such as glycolate, lignosulfonate, polycarboxylate, or polyacrylates. These anions often are the same as the anions which form part of the metal compound precursors from which these novel crystals are formed.

The liquid which is gelled by the present described novel mixed metal hydroxides may be an aqueous liquid, such as water or aqueous solution, or a hydrophylic organic material such as alcohol or ketone; also a dispersion or emulsion comprising an aqueous medium which contains non-soluble ingredients (either organic or inorganic) in dispersed form can be gelled by use of the presently described gelling agent. Whereas the present gelling agent is found useful as a thickening agent for waterbased metal working fluids, fire fighting fluids, food additives, hydraulic fluids, latex paints, stripping fluids, lubricants, and others, especially where extreme pseudoplasticity is a desirable property, it is especially useful in drilling fluids, whether it be for drilling oil wells, water wells, or gas wells, including drilling in the ocean floor.

A mixture of the selected soluble metal compounds, especially the acid salts (e.g. chloride, nitrate, sulphate, phosphate, etc.), are dissolved in an aqueous carrier. The ratios of the metal ions in the solution are predetermined to give the ratios desired in the final product. The concentration limit of the metal compounds in the solution is governed, in part, by the saturation concentration of the least soluble of the metal compounds in the solution; any non-dissolved portions of the metal compounds may remain in the final product as a separate phase, which is not a serious problem, usually, if the concentration of such separate phase is a relatively low amount in comparison to the soluble portions, preferably not more than about 20% of the amount of soluble portions. The solution is then mixed rapidly and intimately with an alkaline source of $OH^-$ ions while substantially avoiding shearing agitation thereby forming monodispersed crystals of layered mixed metal hydroxides. One convenient way of achieving such mixing is by flowing the diverse feed streams into a mixing tee from which the mixture flows, carrying the reaction product, including the monodispersed layered mixed metal hydroxides of the empirical formula shown in the Summary above. The mixture may then be filtered, washed with fresh water to remove extraneous soluble ions (such as $Na^+$, $NH_4^{30}$ ions, and other soluble ions) which are not part of the desired product.

The particular transmission electron microscope used in conducting crystallographic analyses of the subject mixed metal layered hydroxides was operated at its maximum limits of detection, i.e. a resolution of about 8 angstroms. The monodispersed crystals were so thin, with respect to their diameter, that some curling of the monolayer crystals was found, making precise thickness measurements difficult, but reasonable estimates place the crystal thickness in the range of about 8 to about 16 angstroms for various crystals. During the drying process some agglomeration of the crystals is apparent in the analysis, giving rise to particles which contain a plurality of the monolayer unit cell structures. Many flat, unagglomerated crystals are detectable in the analyses. These monolayer crystals are in contradistinction to 2-layer and 3-layer unit cell structures referred to in e.g., U.S. Pat. No. 4,461,714.

One method of preparing the mixed metal layered hydroxide composition, however not exclusively the only method, is to react a solution of metal salts such as magnesium and aluminum salts (approximately 0.25 molar) with an appropriate base such as ammonia or sodium hydroxide in quantities sufficient to precipitate the mixed metal layered hydroxide compound. For ammonium hydroxide, the most preferable range is between about 1 and about 1.5 equivalents of $OH^-$ per equivalent of anion.

The precipitation should be done with little or no shear so that the resultant flocs are not destroyed. One method of accomplishing this is to flow two streams, the salt stream and the base stream, against one another so that they impinge in a low shear, converging zone such as would be found in a tee. The reaction product is then filtered and washed, producing a filter cake of about 10% solids. At this point if the layered mixed metal hydroxide composition has been washed carefully to reduce the dissolved salt concentration to a relatively low point, for example, 300 ppm. an odd phenomenon occurs. Over a period of time, the filter cake goes from a solid waxy material to an opalescent liquid that efficiently scatters light. If ionic material is added back to the dispersion, the viscosity increases drastically and the dispersion gels. The rate of "relaxation" is dependent on the free ion concentrations in the dispersion and will not occur if the concentrations are too high. The effect of various ions on the relaxation process differs. For example, the relaxation process is more tolerant of monovalent ions such as chloride ions than it is of polyvalent ions such as sulfate, carbonate, or phosphate.

If the relaxed dispersion is dried, when the solids level reaches about 20 to 25%, the material forms a solid hard translucent material that is very brittle. It can be crushed to a powder, even though it is approximately 80% water. This solid will not redisperse in water or other hydrophylic solvents. Even if shear is applied with a Waring blender or an ultrasonic cell disrupter, the solids cannot be made to form stable dispersions.

One fruitful method of drying the material is to add a quantity of hydrophylic organic material such as glycerine or polyglycol to the relaxed dispersion prior to drying. If this is done the resultant dry material will spontaneously disperse in water. If a salt is then added to this dispersion, the fluid will build viscosity in the same manner as the liquid dispersion. This drying technique does not work if significant quantities of dissolved salts are present in the dispersion. In this case some dispersion is possible, but the resultant fluid will not build viscosity.

One of the distinguishing features of the presently disclosed mixed metal hydrous oxides is the fact that upon filtration after the flash coprecipitation there remains on the filter a gel which is predominantly the liquid phase with the crystalline hydrous oxides so swollen by the liquid that they are not visible as a solid phase. One might call the gel a "semi-solution" or "quasi-solution" and it has the appearance and feel of a semi-solid wax. This is in contradistinction to prior art hydrous oxide precipitates which are readily filtered out of liquid as a discrete particulate solid material. We would not wish to be limited by this theory, but it appears that the particular crystalline morphology obtained here permits or causes the imbibing and holding of large amounts of liquid.

The mixed metal hydroxide may also be composed of either pure mixed metal hydroxide compounds or physical mixtures of the layered compounds with themselves or other hydrous oxides of the D or T metals such as hydrous alumina, hydrous magnesia, hydrous iron oxides, hydrous zinc oxide, hydrous chromium oxides, and the like.

Even though this disclosure is based largely on the so-called bentonite forms of clay, it should be noted here that other forms and classes of clay are within the ambit of the presently claimed invention, such as amorphous clay (e.g. of the allophane group) and crystalline clay (e.g. 2-layer, 3-layer, expanding-type, non-expanding type, elongate-type, regular mixed layer type, and chain structure type). For example, a non-exhaustive listing of the clays is as follows:

| | |
|---|---|
| bentonite | vermiculite |
| kaolinite | chlorite |
| halloysite | attapulgite |
| smectite | sepiolite |
| montmorillonite | palygorskite |
| illite | Fuller's earth |
| saconite | and the like |

If quantities of the mixed metal layered hydroxide compound are mixed with an aqueous dispersion of sodium bentonite, having a concentration as little as 0.5% wt. the viscosity of the resultant dispersion will drastically increase. The yield point increases dramatically and the plastic viscosity increases only slightly. The lower range of sodium bentonite may be about 2 lb/bbl (0.6% wt.), and the minimum quantity of the mixed metal layered hydroxide required to build significant viscosity is about 0.1 lb/bbl (0.029% wt.). The benefits that are observed are that the resultant clay mixed metal layered hydroxide slurry is essentially unaffected by varying calcium concentrations; it appears to be thermally stable to at least 400° F. (16 hr. test); it supports weighting materials such as barite effectively; it is compatible with common fluid loss control agents such as carboxymethylcellulose, carboxyethylcellulose, polyacrylates, and the like; and the viscosity, especially the yield point, can be easily controlled with commercial thinners such as lignite and lignosulfonate.

The interaction of the mixed metal layered hydroxide with bentonite appears to involve an ion exchange phenomenon. Our current theory concerning the interaction is the following. It is commonly known that clays such as bentonite possess structural defects that give rise to net negative charges in the clay crystals. These charges must be balanced by cations in order to achieve electrical neutrality, giving rise to the cation exchange capacity that is observed with bentonite. In the case of sodium bentonite which is usually the clay of choice for drilling fluids, the sodium ion balances the charge on the crystal. Our data also indicates that there is a significant amount of anion exchange capacity in the mixed metal layered hydroxide compounds that are disclosed herein. We believe that the mixed metal layered hydroxide interacts with the bentonite by ion exchanging with sodium ions. The result of this reaction is that there is an increase in the concentration of soluble sodium salts in the dispersion. The sodium comes from the clay and the anion comes from the mixed metal layered hydroxide. Since the reaction seems to be an ion exchange reaction, it should be possible to cause it to not occur or to destroy the mixed metal layered hydroxide clay interaction by substituting an ion or group of ions into the system which have a greater affinity for either the clay or the mixed metal layered hydroxide compound than the respective associated crystal. Such an ion is phosphate. If phosphate ions are present in the mixed metal layered hydroxide compound, the interaction with the clay does not occur. If phosphate ions are added to a dispersion containing bentonite and mixed metal layered hydroxide compounds, the viscosity decreases and the interaction can be completely destroyed. Other ions that may cause the same effect are organic ions such as lignite, lignosulfonate, and the like. Some ions that do not significantly decrease viscosities are $Na^+$, $Ca^{+2}$, $Mg^{+2}$, $Cl^-$, $CO_3^{-2}$, $HS^-$ and $SO_4^{-2}$. This is not intended to be a complete list of ions that do not interfere with the interaction but is given only as a means of demonstrating the type of ions that may be compatible with the system.

Since a chemical reaction occurs between the clay and mixed metal layered hydroxide compounds, we believe that a new composition of matter has been formed. This new composition appears to be a salt in which the cation is a mixed metal layered hydroxide crystal and the anion is a clay moiety. The composition is characterized as a compound in which both the cation and the anion are discrete crystals. The compositions could be referred to as a "crystal salt", or it could be said that in aqueous dispersion, crystal ion pairs exist. This supposition is further substantiated by the fact that the degrees of interaction appears to be associated with the available cation exchange capacity of the clay that is being used.

In each of the subsequent examples, the mixed metal layered hydroxide compound was prepared by coprecipitation. They were then filtered and washed to produce pure material. This purified product was then dispersed in water containing quantities of clay minerals to build the thickened fluid.

In this disclosure, the following U.S. metric conversion factors are appropriate: 1 gal.=3.785 liters; 1 lb.=0.454 kg; 1 lb./gal. (U.S.)=119.83 kg/m$^3$; 1 bbl.=42 gal. =159 liters; lb./ft$^2 \times$47.88=1 Pascal; 1 lb./100 ft$^2$=4.88 kg./100 m$^2$.

The following examples are to illustrate certain embodiments, but the invention is not limited to the particular embodiments shown.

EXAMPLE 1

A 0.25 molar solution of $MgCl_2 \cdot AlCl_3$ was prepared. This solution was then pumped through a peristaltic pump into one arm of a tee. A 2.5 molar solution of $NH_4OH$ was pumped into a second opposite arm of the tee so that the two solutions met in the tee. The product poured out of the third arm and into a beaker. The flows of the two solutions were carefully adjusted so that the product of the coprecipitation reaction would have a pH of about 9.5. In this situation that amounts to about a 10 to 20% excess of $NH_4OH$. The reactor product consisted of delicate flocs of $MgAl(OH)_{4.7}Cl_{0.3}$ suspended in an aqueous solution of $NH_4Cl$. The dispersion was then carefully poured into a Buchner Funnel with a medium paper filter. The product was filtered and washed in the filter with water to remove the excess $NH_4Cl$. The dissolved $Cl^-$ concentration was about 300 ppm. as measured by $Cl^-$ specific ion electrode. The filter cake that resulted was translucent, but not optically clear.

The cake was about 9% solids by weight, determined by drying a sample at 150° C. for 16 hrs. The cake had the consistency of soft candle wax. The product was analysed for Mg and Al. It was found that the Mg:Al ratio was essentially 1:1.

Electron micrographic analysis of the product showed tiny platelets with diameters of 300 to about 500 angstroms. The particles were so thin that in some cases, they curled. Estimates of thicknesses of these crystals are about 10 to about 20 angstroms. The maximum resolution on the microscope is about 8 angstroms. The theoretical thickness of one layer of $MgAl(OH)_{4.7}Cl_{0.3}$ is 7.5 angstroms. It should also be noted that in the process of preparing the sample for electron microscopy, the material was dried which probably caused a degree of agglomeration, giving rise to particles which contain a plurality of the monolayer unit cell structures.

After sitting undisturbed for about 16 hours, the filter cake had the consistency of petroleum jelly. After about 48 hours, the material was a thixotropic liquid. The relaxation process continued for about 5 days. At the end of this time, the product was more viscous than water but it was pourable.

A stock dispersion containing 20 lb/bbl of sodium bentonite obtained from Baroid under the brand name Aquagel was prepared and allowed to sit undisturbed for 24 hrs. Several dispersions were then prepared from the stock dispersion. Each contained 5 lb/bbl of bentonite and the quantity of $MgAl(OH)_{4.7}Cl_{0.3}$, described above, was varied from 0.1 lb/bbl to 1.0 lb/bbl. The following Table I lists the yield point, plastic viscosity, and 10 sec. and 10 min. gel strengths for each of the compositions, as measured using a Fann viscometer.

TABLE I

| Amount* of Mixed Metal Hydroxide Added to the Bentonite Dispersion | Yield Point** | Plastic Visc. cp | Gel Strengths** 10 sec. gel | 10 min. gel |
|---|---|---|---|---|
| 0.1 | −0.50 | 2.0 | 0.00 | 0.00 |
| 0.3 | 3.00 | 3.0 | 0.25 | 1.00 |
| 0.5 | 10.50 | 3.0 | 4.00 | 5.00 |
| 0.8 | 24.50 | 4.5 | 9.50 | 8.00 |
| 1.0 | 28.00 | 6.5 | 8.00 | 7.00 |

*Amount is in lb/bbl; 1 lb/bbl = 2.85 kg/m$^3$
**Given in lb/100 ft$^2$; 1 lb/100 ft$^2$ = 4.88 kg/100 m$^2$

EXAMPLE 2

A sample of ultra pure sodium bentonite obtained from Baroid, under the brand name Aquagel Gold Seal, was dispersed in deionized water to make a 10 lb/bbl dispersion. This was allowed to sit for 24 hrs. Two 350 ml aliquots of the bentonite slurry were prepared. One contained no $MgAl(OH)_{4.7}Cl_{0.3}$ and the other contained 1 lb/bbl of the $MgAl(OH)_{4.7}Cl_{0.3}$ described above. A 350 ml. sample was also prepared that contained only 1 lb/bbl of $MgAl(OH)_{4.7}Cl_{0.3}$ and no bentonite. Next, each of the samples, including a sample that had not been treated with $MgAl(OH)_{4.7}Cl_{0.3}$ were filtered in an API filter press at 100 psi. The filtrates were placed in acid washed polypropylene bottles. A sample of the $MgAl(OH)_{4.7}Cl_{0.3}$ and the deionized water that was used throughout the experiment were filtered through the filter press. After the filtrates were collected, the solutions were analysed for 27 elements with a Leeman Plasma Spectrometer. The only elements that appeared in significant quantities were Na, Ca, and Mg. Chloride was analysed by specific ion electrode and $NH_4^+$ was analysed colorimetrically. The results are tabulated below in Table II.

TABLE II

| Composition of Sample | Concentration, meq/l | | | | |
|---|---|---|---|---|---|
| | $NH_4^+$ | $Na^+$ | $Mg^{+2}$ | $Ca^{+2}$ | $Cl^-$ |
| Deionized H$_2$O | 0.04 | 0.012 | 0.014 | 0.01 | 0.28 |
| 1 lb/bbl MgAl(OH)$_{4.7}$Cl$_{0.3}$ | 2.79 | 0.00 | 2.24 | 0.08 | 3.09 |
| 1 lb/bbl MgAl(OH)$_{4.7}$Cl$_{0.3}$ and 5 lb/bbl Na bentonite | 1.16 | 6.17 | 0.08 | 0.08 | 5.49 |
| No. of meq of ions exchanged on the Bentonite | 1.63 | 0.0 | 2.16 | 0.00 | 0.00 |

From the above, the following computations are made: meq of excess $Na^+$=-

/Na/—/NH$_4$/—/Mg/ = 6.17 − 1.63 − 2.16 = 2.38. No. of meq of Cl$^-$ ions exchanged from the MgAl(OH)$_{4.7}$Cl$_{0.3}$ = 5.49 − 3.09 = 2.40 meq. These data indicate that substantially equivalent amounts of sodium and chloride ions are released when the reaction occurs.

It will be understood by practitioners of these relevant arts that the adducts formed in accordance with the present invention will be expected to have waters of hydration accompanying them unless driven off by elevated temperature of, generally greater than about 100° C.

We claim:

1. A composite comprising the adduct or reaction product of at least one mineral clay with at least one monodispersed monolayer crystalline mixed metal layered hydroxide conforming essentially to the empirical formula $$Li_m D_d T(OH)_{(m+2d+3+na)} A_a^n,$$

where m represents the number of Li ions present; the said amount being in the range of zero to about 1;

D represents divalent metals ions; with d representing the amount of D ions in the range of zero to about 4;

T represents trivalent metal ions;

A represents monovalent or polyvalent anions of valence −n, other than OH$^-$, with a being the amount of A anions; and where (m + 2d + 3 + na) is equal to or greater than 3.

2. The composition of claim 1 wherein m represents an amount in the range of about 0.5 to about 0.75.

3. The composition of claim 1 wherein d represents an amount in the range of about 1 to about 3.

4. The composition of claim 1 wherein d represents an amount of about 1.

5. The composition of claim 1 wherein D is at least one of group comsisting of Mg, Ca, Ba, Sr, Mn, Fe, Co, Ni, Cu, and Zn.

6. The composition of claim 1 wherein D is at least one of the group consisting Mg and Ca.

7. The composition of claim 1 wherein D is Mg.

8. The composition of claim 1 wherein D is Ca.

9. The composition of claim 1 wherein T is at least one of the group consisting of Al, Ga, Cr, and Fe.

10. The composition of claim 1 wherein T is Al or Fe.

11. The composition of claim 1 wherein T is Al.

12. The composition of claim 1 wherein T is Fe.

13. The composition of claim 1 wherein A is at least one monovalent or polyvalent inorganic anion.

14. The composition of claim 1 wherein A is at least one monovalent or polyvalent organic anion.

15. The composition of claim 1 wherein A is at least one monovalent or polyvalent anion of the group consisting of halide, sulfate, nitrate, phosphate, carbonate, glycolate, lignosulfonate, polycarboxylate, polyacrylate, and sodium polyacrylate.

16. The composition of claim 1 wherein the mineral clay is at least one of the group consisting of bentonite, kaolinite, halloysite, smectite, illite, montmorillonite, saconite, vermiculite, chlorite, attapulgite, sepiolite, palygorskite, and Fuller's earth.

17. The composition of claim 1 wherein tne mineral clay is at least one of the classes consisting of amorphous clays of the allophane group and crystalline clays of the 2-layer type, 3-layer type, expanding type, non-expanding type, elongate type, regular mixed layer type, and chain structure type.

18. The composition of claim 1 wherein the mineral clay is bentonite.

19. The composition of claim 1 wherein the mineral clay is beneficiated bentonite.

20. The composition of claim 1 wherein the weight ratio of layered hydroxide/clay is in the range of about 0.02/1 to about 1/1.

21. A method for reacting a mineral clay with a monodispersed monolayer mixed metal layered hydroxide of the formula $$Li_m D_d T(OH)_{(m+2d+3+na)} A_a^n,$$

where m is an amount in the range of zero to about 1;

D is a divalent metal ion, with d in the range of zero to about 4;

T is a trivalent metal ion;

A represents monovalent or polyvalent anions other than OH$^-$, of valence −n, with a being the amount of A anions;

(m + d) is greater than zero and (m + 2d + 3 + na) is equal to or greater than 3, said method comprising reacting, by intimately mixing together, an aqueous gel or dispersion of said layered hydroxide with an aqueous dispersion of the clay whereby metal ions from the clay and anions from the layered hydroxide go into the aqueous solution by ion exchange of clay anions for layered hydroxide anions and whereby an adduct of the mixed metal layered hydroxide and the clay is formed.

22. The method of claim 21 wherein the mixed metal layered hydroxide is MgAl(OH)$_{4.7}$Cl$_{0.3}$ and the clay is bentonite.

* * * * *

UNITED STATES PATENT AND TRADEMARK OFFICE
CERTIFICATE OF CORRECTION

PATENT NO. : 4,664,843
DATED : May 12, 1987
INVENTOR(S) : John L. Burba, III, et al.

It is certified that error appears in the above-identified patent and that said Letters Patent is hereby corrected as shown below:

Col. 1, line 11 & 12, insert a comma after the word "water" and delete the comma after the word "aqueous", it should read -- water, aqueous --.

Col. 1, line 18, "389,319," should read -- 4,389,319, --.

Col. 4, line 30, "$NH_4^{30}$" should be -- $NH_4^+$ --.

Col. 4, line 66, "filter cake" should be one word to read -- filtercake --.

Col. 5, line 8, "oonoentrations" should read -- concentrations --.

Col. 9, line 41, "comsisting" should read -- consisting --.

Col. 9, line 44, insert the word -- of -- after "consisting".

Col. 10, line 13, "tne" should read -- the --.

Signed and Sealed this

Nineteenth Day of April, 1988

Attest:

DONALD J. QUIGG

Attesting Officer

Commissioner of Patents and Trademarks